United States Patent
Lamoureux et al.

(10) Patent No.: US 9,881,262 B2
(45) Date of Patent: Jan. 30, 2018

(54) UNDO/REDO OF DATABASE FILES FOR MODIFYING RE-ACCOMMODATION

(71) Applicant: Amadeus S.A.S., Biot (FR)

(72) Inventors: Yann Lamoureux, Biot (FR); Alexis Langlade, Cagnes sur Mer (FR); Geoffroy Le Prado, Singapore (SG); Kenza Sebti, Nice (FR); Nicolas Monteil, Villeneuve Loubet (FR)

(73) Assignee: Amadeus S.A.S., Biot (FR)

( * ) Notice: Subject to any disclaimer, the term of this patent is extended or adjusted under 35 U.S.C. 154(b) by 221 days.

(21) Appl. No.: 14/604,977

(22) Filed: Jan. 26, 2015

(65) Prior Publication Data
US 2016/0217046 A1    Jul. 28, 2016

(51) Int. Cl.
| G06F 17/00 | (2006.01) |
| G06Q 10/02 | (2012.01) |
| G06F 17/22 | (2006.01) |
| G06F 17/30 | (2006.01) |

(52) U.S. Cl.
CPC ......... *G06Q 10/02* (2013.01); *G06F 17/2288* (2013.01); *G06F 17/30377* (2013.01)

(58) Field of Classification Search
None
See application file for complete search history.

(56) References Cited

U.S. PATENT DOCUMENTS

| 8,909,604 B1* | 12/2014 | Holenstein | G06F 11/1469 |
| | | | 707/678 |
| 2003/0225600 A1* | 12/2003 | Slivka | G06Q 10/02 |
| | | | 705/5 |
| 2004/0199411 A1* | 10/2004 | Bertram | G06Q 10/02 |
| | | | 705/5 |
| 2005/0123265 A1 | 6/2005 | Kimura | |
| 2005/0125263 A1 | 6/2005 | Bramnick et al. | |
| 2005/0125265 A1* | 6/2005 | Bramnick | G06Q 10/02 |
| | | | 705/5 |
| 2008/0134161 A1* | 6/2008 | Chamieh | G06F 9/4436 |
| | | | 717/166 |
| 2013/0117057 A1* | 5/2013 | Van Moltke | G06Q 10/06311 |
| | | | 705/7.13 |

(Continued)

*Primary Examiner* — Hung Le
(74) *Attorney, Agent, or Firm* — Thompson Hine LLP

(57) ABSTRACT

Methods, apparatus, and computer program products for modifying re-accommodations. A report characterizing execution of a re-accommodation may be stored in a report database. The report may include an impacted Passenger Name Record (PNR) table that associates each PNR impacted by the re-accommodation with an identifier. The identifier may identify an envelope in a history file comprising a portion of the history file that documents changes made to the PNR by the re-accommodation. In response to receiving a request to modify the re-accommodation, the report may be retrieved from the report database. PNRs impacted by the previous re-accommodation, and changes made to each PNR, may be determined using data in the impacted PNR table and the history files of the PNRs. The impacted PNR table may thereby enable building and execution of a modifying re-accommodation that selectively undoes or redoes a previously executed re-accommodation to implement new solutions to scheduling changes.

20 Claims, 6 Drawing Sheets

(56) References Cited

U.S. PATENT DOCUMENTS

| | | | |
|---|---|---|---|
| 2014/0258228 A1* | 9/2014 | Bhide | G06F 17/2288 |
| | | | 707/625 |
| 2016/0071116 A1* | 3/2016 | Atkins | G06Q 10/02 |
| | | | 705/5 |
| 2016/0117617 A1* | 4/2016 | Peters | G06Q 10/025 |
| | | | 705/6 |
| 2016/0147786 A1* | 5/2016 | Andrei | G06F 17/30368 |
| | | | 707/695 |
| 2016/0179978 A1* | 6/2016 | Dhupar | G06F 9/4443 |
| | | | 707/683 |

\* cited by examiner

26a
```
    --- RLR ---
RP/MUC1A0701/MUC1A0701            YDJ7XS
  1.DUPONT/JEAN MR
  2  6X111  Y  30JUN  1  NCELHR  HK1
  3  6X112  Y  30JUN  1  LHRICN  HK1
  4  SSR BIKE  6X HK/S2,3
  5  FA 123-1234686250/S2,3
```

26b
```
    --- RLR ---
RP/MUC1A0701/MUC1A0701            YDJ7XS
  1.DUPONT/JEAN MR
  2  6X111  Y  30JUN  1  NCELHR  UN1
  3  6X112  Y  30JUN  1  LHRICN  UN1
  4  6X211  C  30JUN  1  NCELHR  TK1
  5  6X212  C  30JUN  1  LHRICN  TK1
  6  SSR BIKE  6X UN/S2,3
  7  FHE 123-12346486250
```

26c
```
    --- RLR ---
RP/MUC1A0701/MUC1A0701            YDJ7XS
  1.DUPONT/JEAN MR
  2  6X311  C  29JUN  1  NCEICN  HK1
  3  SSR VGML  6X HK/S2
  4  FA 123-1234567890/S2
```

FIG. 2

| IMPACTED PNR TABLE ||
|---|---|
| RECORD LOCATOR | ENVELOPE IDENTITY NUMBER |
| RMT33W | 005 |
| KZVGX5 | 009 |
| ⋮ | ⋮ |
| IIRCYC | 013 |

UNDO/REDO OF DATABASE FILES FOR MODIFYING RE-ACCOMMODATION

BACKGROUND

The invention generally relates to computers and computer software, and in particular to methods, apparatus, and computer program products that update files in travel-related databases to modify a previously executed re-accommodation.

A Computer Reservations System (CRS) typically comprises one or more networked computers or computer systems configured to store and retrieve information. The CRS may be configured to facilitate transactions related to air and train travel, hotels, car rental, or other travel-related services. A CRS that is capable of booking and selling tickets for services offered by multiple travel service providers may be referred to as a Global Distribution System (GDS). Typically, CRSs include or access multiple systems and associated databases that store information relating to the aforementioned transactions. These databases may include, for example, a Passenger Name Record (PNR) database for storing travel itinerary data, an Electronic Ticketing System (ETS) database for storing ticketing data, a Departure Control System (DCS) database for storing traveler check-in and service use data, and an inventory system database for storing availability data. These systems may comprise a processing and database system or apparatus for selling and managing the use of travel-related services.

Various types of schedule changes can disrupt booked travel itineraries, thereby prompting a need to rebook travelers with alternative arrangements. Exemplary events that may cause rebooking of travelers include flight schedule changes to re-optimize the airline network, routing and equipment changes, and flight delays or cancellations arising from mechanical problems with equipment, crew availability, or weather conditions. The process of modifying travel itineraries to account for schedule changes is sometimes referred to as a re-accommodation.

In response to a flight schedule change, the CRS may be used to re-accommodate impacted passengers by scheduling them on another segment that provides a suitable replacement for the impacted segment. To this end, the CRS may be used to determine one or more alternative segments that can be used to replace the impacted segment. If necessary, the CRS may also determine alternative segments to replace outbound and inbound segments connected to the impacted segment. Once a solution is selected, the CRS may update the PNR containing the travel itinerary of each impacted passenger in the PNR database. Changes to PNRs may further create a need to update data in the ETS, DCS, and inventory systems. Thus, the re-accommodation may affect data spread across multiple databases.

In some cases, it may be desirable to undo a re-accommodation by modifying the database files to their pre-re-accommodation state, or redo a re-accommodation by modifying the database files to include a different set of replacement segments. For example, the re-accommodation may have been executed by mistake. The re-accommodation may also have been triggered based on erroneous cancellation of a flight segment due to an error from a schedule planning system, an erroneous business rule setting causing a flight or segment cancellation, or transferring passengers to an incorrect booking class. Replacement segments may also be selected in error by the re-accommodation so that travelers having itineraries subject to the re-accommodation would be transferred to incorrect flights or dates unless the travel itinerary is corrected.

In a conventional CRS, it may be difficult to determine which PNRs have been modified as a result of a previous re-accommodation, or what those modifications were. For example, a canceled flight that triggered the re-accommodation may no longer exist in the CRS or be active in the PNR database. In addition, because not all passengers subject to the re-accommodation will necessarily be rebooked on the same replacement segment, it may not be possible to determine which PNRs have been modified by the re-accommodation based on currently booked segments. This problem may be further magnified by the number of inter-related databases impacted by the re-accommodation, by loss of original data when these database files are modified, and by cascading effects of the schedule change. Additional modifications to the travel itinerary subsequent to the re-accommodation may further obscure the database modifications that need to be rolled back in order to undo the re-accommodation.

Thus, improved methods, apparatus, and computer program products for identifying and rolling back database modifications caused by a re-accommodation are needed to assist CRS users in modifying previously executed re-accommodations.

SUMMARY

In an embodiment of the invention, an apparatus for updating one or more databases modified by a re-accommodation is provided. The apparatus includes one or more processors and a memory coupled to the one or more processors. The memory includes data structures comprising a first database of reports, a second database of passenger name records, and program code. The program code is configured so that, when executed by at least one of the one or more processors, the program code causes the apparatus to receive a request to execute a second re-accommodation that modifies the first re-accommodation. In response to receiving the request, the program code may cause the apparatus to retrieve a report associated with the re-accommodation from the first database. The report may include a record locator that identifies a passenger name record modified by the first re-accommodation, and an identifier that identifies a first envelope of a plurality of envelopes comprising a history file of the passenger name record. The program code may further cause the apparatus to identify, based on the record locator, the passenger name record in the second database, the passenger name record being in a first state that represents a current status of the passenger name record, and identify, based on the identifier, a portion of the history file corresponding to a modification made to the passenger name record by the re-accommodation. The apparatus may then determine, based on the portion of the history file, a second state of the passenger name record that represents a previous status of the passenger name record before the first re-accommodation, and determine, based on the first request, a third state of the passenger name record that represents a desired status of the passenger name record after execution of the second re-accommodation. The apparatus may then modify, based on the second state, the passenger name record from the first state to the third state.

In another embodiment of the invention, a method of updating the databases modified by the first re-accommodation is provided. The method includes receiving the request to execute the second re-accommodation that modifies the first re-accommodation, and in response to receiving the request, retrieving the report associated with the first re-accommodation from the first database. The report may include the record locator of the passenger name record modified by the re-accommodation, and the identifier that identifies the first envelope of the plurality of envelopes comprising the history file. The method may further include identifying, based on the record locator, the passenger name record in the second database, and identifying, based on the identifier, the portion of the history file corresponding to the modification made to the passenger name record by the first re-accommodation. The method may further include determining, based on the portion of the history file, the second state of the passenger name record that represents the previous status of the passenger name record before the first re-accommodation, and determining, based on the first request, the third state of the passenger name record that represents the desired status of the passenger name record after execution of the second re-accommodation. The method may then modify, based on the second state, the passenger name record from the first state to the third state.

In another embodiment of the invention, a computer program product is provided for updating the databases modified by the first re-accommodation that includes a non-transitory computer-readable storage medium including program code. The program code may be configured, when executed by the at least one processor, to cause the at least one processor to receive the request to execute the second re-accommodation that modifies the first re-accommodation. In response to receiving the request, the program code may cause the at least one processor to retrieve the report associated with the re-accommodation from the first database. The report may include the record locator that identifies the passenger name record modified by the first re-accommodation, and the identifier that identifies the first envelope of the plurality of envelopes comprising the history file of the passenger name record. The program code may further cause the at least one processor to identify, based on the record locator, the passenger name record in the second database, the passenger name record being in the first state that represents the current status of the passenger name record, and identify, based on the identifier, the portion of the history file corresponding to the modification made to the passenger name record by the re-accommodation. The at least one processor may then determine, based on the portion of the history file, the second state of the passenger name record that represents the previous status of the passenger name record before the first re-accommodation, and determine, based on the first request, the third state of the passenger name record that represents the desired status of the passenger name record after execution of the second re-accommodation. The at least one processor may then modify, based on the second state, the passenger name record from the first state to the third state.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIG. 2 is a diagrammatic view of an exemplary history file of a PNR in the PNR database of FIG. 1.

DETAILED DESCRIPTION

Figure 1:
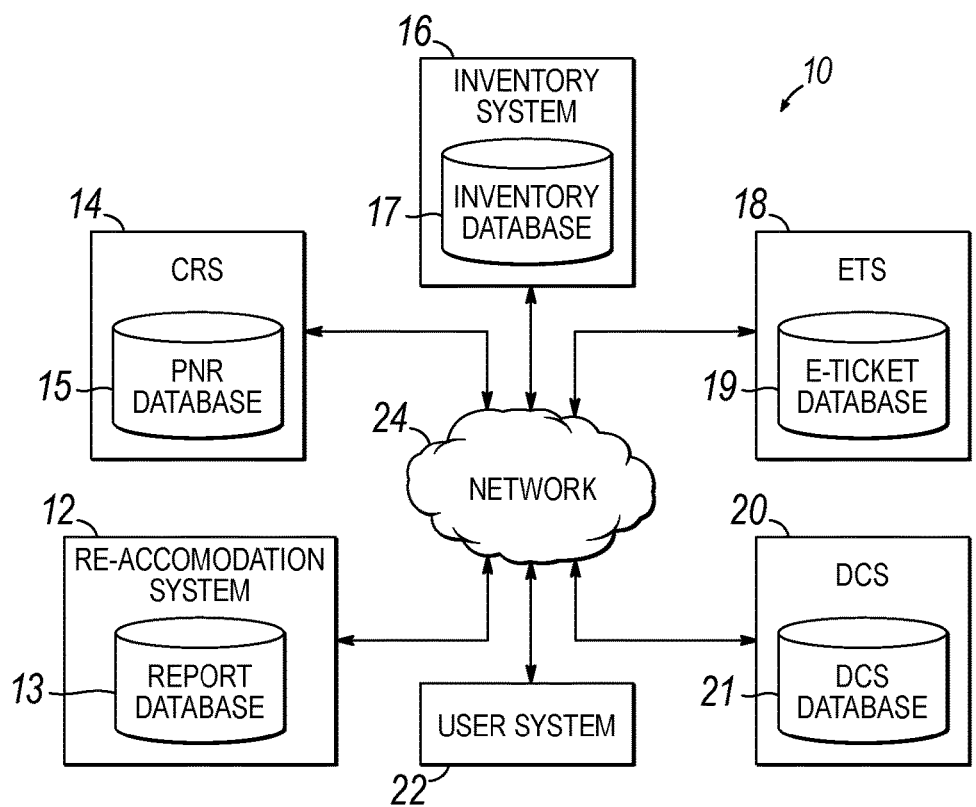
FIG. 1 is a diagrammatic view of an exemplary processing and database apparatus including a plurality of computing systems, a PNR database, and a report database.

A travel itinerary may include one or more segments that connect an origin location and a destination location. In the context of air travel, a segment may comprise operation of a flight with a single flight designator between one point where travelers first board an aircraft (the boarding point) and another point where the travelers disembark the aircraft (the disembarkation point). A segment may comprise one or more legs each comprising operation of the aircraft from one scheduled departure station to a next scheduled arrival station. Thus, a leg involves only one departure and one arrival, while a segment may include several connected legs, and thus comprise more than one departure and arrival. Thus, the travel itinerary may comprise a plurality of connected segments, with the traveler changing planes at each connection point between consecutive segments.

Following an event that affects scheduling of a segment (e.g., cancellation of a flight connecting two locations), travelers having booked travel itineraries that include the impacted segment may need to have their travel itineraries modified. To remedy this situation, a system user, such as a travel agent or carrier employee, may execute a re-accommodation. The re-accommodation may identify travel itineraries that include the impacted segment. This identification may be accomplished by, for example, searching a Passenger Name Record (PNR) database for PNRs that include the impacted segment. The re-accommodation may then create one or more solutions that modify the identified travel itineraries. The modification may include replacing the impacted segment, or a combination of segments including the impacted segment, in the PNR with a replacement segment or combination of replacement segments. The re-accommodation may further determine what services are associated with the impacted segments or travelers, and further modify the identified travel itineraries to account for these services. The re-accommodation may then update various database files to implement one or more of the solutions.

The re-accommodation may be executed in a processing and database apparatus that includes a re-accommodation system. The re-accommodation system may execute the re-accommodation, collect data relating to the execution, and generate a report including this data. The report may include a list of segments impacted by the re-accommodation, the solutions implemented by the re-accommodation, and a table of impacted PNRs modified by the re-accommodation. Each PNR in the list of PNRs may be associated with a history file comprising a plurality of data structures, or envelopes, each having an identifier. Each envelope in turn may include data defining modifications made to the PNR, such as the state of the PNR at a specific point in time, e.g., immediately after the modifications were made. The table of impacted PNRs may include data identifying envelopes added to the history file of each PNR as a result of actions taken by the re-accommodation. By identifying the envelopes added as a result of the re-accommodation, the table of impacted PNRs may be used to determine the state of each impacted PNR as the PNR existed immediately after the initial re-accommodation. This state may then be compared to the current state of the PNR in question, thereby enabling the re-accommodation system to identify modifications made to a PNR as a result of a previously executed re-accommodation.

In the event there is an issue with the re-accommodation, the user may want to modify the re-accommodation by either restoring one or more of the re-accommodated PNRs to their pre-re-accommodation state, or by implementing a different option for replacing the impacted segment. To this end, the user may execute a modifying re-accommodation that modifies the impacted PNRs based on actions taken by the previous re-accommodation. The modifying re-accommodation may be configured to undo the previous re-accommodation by restoring the PNRs to the states they were in prior to the previous re-accommodation, or to redo the previous re-accommodation by implementing a different solution for solving the scheduling change.

To implement a modifying re-accommodation, the re-accommodation system may retrieve the report generated by the previous re-accommodation. The re-accommodation system may then use the data in the report to determine which PNRs were modified by the previous re-accommodation, how they were modified, and whether they are eligible for modification by the modifying re-accommodation. The re-accommodation system may then recover eligible PNRs by returning them to the state they were in prior to execution of the previous re-accommodation, or modify the PNRs to implement an alternative solution that addresses the schedule change. The re-accommodation system may also cause files maintained by other systems to be synchronized with the PNR files in the PNR database.

Referring now to FIG. 1, a processing and database apparatus 10 in accordance with an embodiment of the invention may include a re-accommodation system 12 including a report database 13, a Computer Reservations System (CRS) 14 including a PNR database 15, an inventory system 16 including an inventory database 17, an Electronic Ticketing System (ETS) 18 including an e-ticket database 19, a Departure Control System (DCS) 20 including a DCS database 21, and a user system 22. Each of systems 12, 14, 16, 18, 20, 22 may communicate through a network 24, which may include one or more private or public networks (e.g., the Internet) that enable the exchange of data between the systems 12, 14, 16, 18, 20, 22.

The re-accommodation system 12 may host or otherwise provide one or more modules that build and execute re-accommodations. Each of the systems 14, 16, 18, 20 may interface with the re-accommodation system 12 to enable the re-accommodation system 12 to update database files maintained by the systems 14, 16, 18, 20. These files may include files relating to PNRs, carrier inventories, e-tickets, Electronic Miscellaneous Documents (EMDs), and DCS data. The re-accommodation system 12 may also generate a report that documents the results of each re-accommodation executed. The re-accommodation process may comprise a build phase and an execution phase. The build phase may comprise building one or more options that, when implemented, modify PNRs in accordance with the intended results of the re-accommodation. The execution phase may comprise actions taken to update the CRS 14, inventory system 16, ETS 18, and DCS 20 in accordance with the re-accommodation. The execution phase may be split into separately executable parts. These parts may be based on dates of the travel itineraries of the impacted PNRs, with each date being processed in parallel or sequentially as system resources permit.

In response to a flight schedule change, or any other event that impacts a segment, such as a voluntary action by an airline agent, the re-accommodation system 12 may analyze traveler itineraries, and provide options for solving problems caused by the flight schedule change. The flight schedule change may comprise, for example, cancellation of a flight, a routing change, a timing change, or a class change to the impacted segment. The options provided for solving the problems caused by the flight schedule change may include deleting the impacted segment from the PNR and adding one or more replacement segments to replace the impacted segment. Other options for solving the problems may include updating the segment timing in case of timing change, applying the schedule change (e.g., changing routing), and replacing additional inbound or outbound segments connected to the impacted segment. The re-accommodation system 12 may be accessed via the user system 22, thereby enabling a system user to build or select a re-accommodation configured to implement one or more options for solving the impacted travel itineraries. In response to the user requesting the re-accommodation system 12 to execute the re-accommodation, the re-accommodation system 12 may cause one or more of the systems 14, 16, 18, 20 to modify database files in one or more of the corresponding databases 15, 17, 19, 21. The re-accommodation system may also collect data relating to execution of the re-accommodation and store this data in the report database 13.

The report database 13 may store a report for each executed re-accommodation. The report may include data indicative of the actions performed to execute the corresponding re-accommodation, and the results of these actions. Each re-accommodation may comprise one or more actions configured to modify database files to implement the solutions to the schedule change. These actions may include database queries and instructions to modify PNRs, inventories, e-tickets, and DCS data.

The CRS 14 may be used to store and retrieve information, and conduct on-line transactions related to the booking of travel services. These services may include, for example, tickets for air travel purchased by a customer accessing a travel service provider. In the context of air travel, the CRS 14 may respond to travel itinerary queries from the travel service provider, such as a travel agent, by identifying particular flights that satisfy a desired set of travel itinerary characteristics, and to make or book reservations. The re-accommodation system 12 and CRS 14 may be embodied in a global distribution system (GDS), which is a type of CRS that books and sells travel tickets for multiple carriers.

The CRS 14 may include or otherwise communicate with one or more databases (not shown) that store carrier scheduling information. The CRS 14 may also create and maintain PNRs corresponding to booked itineraries in the PNR database 15. Each PNR may comprise one or more reservation records each defining one or more reservations booked by the traveler. The PNR may also track usage of purchased travel services. The PNR may be identified by a record locator unique to that PNR, and may include records defining the travel itinerary for a particular trip, service, passenger, or group of passengers. The travel itinerary may include services from multiple carriers (e.g., seats on flight, bus, or rail segments), ancillary services from one or more carriers (e.g., a right to check additional baggage or an in-flight meal), auxiliary services from non-carriers (e.g., hotel reservations or rental car reservations), or any other travel-related service.

Each PNR in the PNR database 15 may be associated with a history file. The history file may comprise a record of the creation of, and any subsequent modifications to, the PNR. The history file may provide data that enables a system to determine if and when an element of the PNR has been modified, and what the modification included. Each time the PNR is updated, an additional envelope may be created and appended to the history file. Each envelope may include an identifier, such as a sequential number. For identifiers comprising sequential numbers, the lowest envelope number (e.g., envelope 000) may correspond to the envelope associated with creation of the PNR. Each envelope may include data defining a modification made to the PNR, a state of the PNR before or after the modification, a time and date the modification was made or the state of the PNR existed, information about the travel agent or the automated system making the modification, the name of the person that requested the modification, or any other suitable information relating to the PNR.

Referring now to FIG. 2, an exemplary history file 25, or a portion thereof, may include three envelopes 26a-26c. Envelope 26a may represent an initial state X of the PNR prior to a previous re-accommodation. The travel itinerary defined by the depicted envelope 26a includes a flight between Nice and Seoul comprising one segment from Nice Cote D'Azur to London Heathrow on June 30 (6X111 30JUN NCELHR), and another segment from London Heathrow to Seoul Incheon on June 30 (6X112 30JUN LHRICN). In response to the segment connecting Nice and London being impacted (e.g., canceled), the previous re-accommodation may be executed to implement a solution which modifies the state of the PNR from state X to state X+1. To record this modification, envelope 26b may be added to the history file to represent the state X+1 of the PNR immediately after the re-accommodation. As shown in envelope 26b, the status codes of the initial flight segments have changed from HK to UN to indicate that the segments are no longer active, and two replacement segments 6X211 C 30JUN 1 NCELHR and 6X212 C 30JUN 1 LHRICN have been added.

Envelope 26c may represent a current state of the PNR. That is, the state of the PNR at a time immediately before a modifying re-accommodation is to be executed. This may represent, for example state X+n, where n represents some number of states that the PNR has been in since the initial state X. In the example depicted by envelope 26c, the flight comprising the replacement segments 6X211 C 30JUN 1 NCELHR and 6X212 C 30JUN 1 LHRICN has been removed from the travel itinerary. This change may reflect a manual cancellation by a travel agent, or may be due to an intervening re-accommodation. Thus, the history file may be configured so that it is possible to retrieve the state of the PNR corresponding to any envelope stored in the PNR history. Persons having ordinary skill in the art will understand that the envelopes 26a-26c depicted are for exemplary purposes only. In particular, it should be understood that the current state of the PNR (e.g., state X+n) and the PNR state immediately after the previous re-accommodation (e.g., X+1) may be the same if the replacement travel itinerary has not been changed since the previous re-accommodation.

With continued reference to FIG. 1, the inventory system 16 may include the inventory database 17, which may store inventories of segments and services provided by the carriers, including bookings, counters, and availabilities. The inventory database 17 may also maintain a count of the availability of each travel service. For example, the inventory system 16 may track the number of seats that a carrier has available for sale at any given time for any given flight, a seat map with seat numbers, and a number of booked special services and corresponding quotas. The CRS 14 may query the inventory system 16 to determine availability of a travel service prior to pricing or booking the service. In response to booking the service, the CRS 14 may transmit a message to the inventory system 16 to update the inventory database 17 to reflect the sale.

The ETS 18 may comprise a computer system configured to maintain records of the booking and use of tickets in the form of an electronic ticket, or "e-ticket" maintained in the e-ticket database 19. The ETS 18 may track the status of e-tickets issued for travel services such as flights by storing data to, and retrieving data from, the e-ticket database 19. Purchasing the e-ticket may involve pricing, booking, and ticketing of the underlying travel services. The resulting e-ticket may be comprised of one or more electronic coupons. Each coupon may correspond to one or more of the segments or services of the travel itinerary defined by the corresponding PNR in PNR database 15. The e-ticket coupons may identify the segments for which the e-ticket can be used to obtain a boarding pass, or other services that comprise the travel itinerary. The e-ticket database 19 may also store other types of electronic documents, such as an EMD, that represent a payment for chargeable services which have been purchased by the traveler. These chargeable services may be represented in the PNR using Special Service Requests (SSRs). Services that are chargeable may be associated to an EMD and coupon number in the PNR.

The DCS 20 may provide automated processing of tickets as the travel services booked by the tickets are used, and may store and maintain passenger data related to the operational window in the DCS database 21. Exemplary data maintained by the DCS 20 may include data relating to the check-in status, checked baggage, and boarding passes issued for the travel itinerary. This processing may include printing boarding passes and other coupons that are redeemed when receiving booked travel services. Exemplary features that may be provided by the DCS 20 may include, but are not limited to, tracking checked baggage, ticket use by the traveler, airport check-in and boarding, handling of regulatory information such as passport number or Advanced Passenger Information System (APIS) data, choosing seats for the passengers and delivering seat numbers when passengers are accepted on the flight, handling standby passengers, issuing the passenger manifest, and interacting with catering system for meal requests. To perform these services, the DCS 20 may operate cooperatively with the ETS 18 and various computing devices including, but not limited to, check-in kiosks, check-in web-sites, and mobile devices of the travelers.

The DCS 20 may operate cooperatively with the CRS 14 and ETS 18 to update the PNR database 15 and e-ticket database 19 so that the status of the PNR and e-ticket is updated as travel services are used. For example, these databases may be updated in response to the traveler checking-in at an airport, boarding an aircraft, or otherwise using a service. For a given flight, there may be a period of time prior to departure during which the flight is created, and passenger and ticket information linked to the flight is entered into the DCS 20. This period of time may be referred to as a "DCS window". During the DCS window, the flight may be populated with passengers by adding passenger names to a passenger name list (PNL). The PNL may be built by the inventory system 16, and sent to the DCS 20 as a one-time message that is used by the DCS 20 to generate records relating to the passengers. These passenger records may then be modified by the DCS 20 as the passengers are checked in or boarded to reflect the status of the passengers.

The user system 22 may provide travel agents, or other system users, with a user interface for accessing the re-accommodation system 12 and CRS 14. The user system 22 may thereby enable agents to search for and book travel itineraries as well as build and execute re-accommodations.

Figures 3, 5:
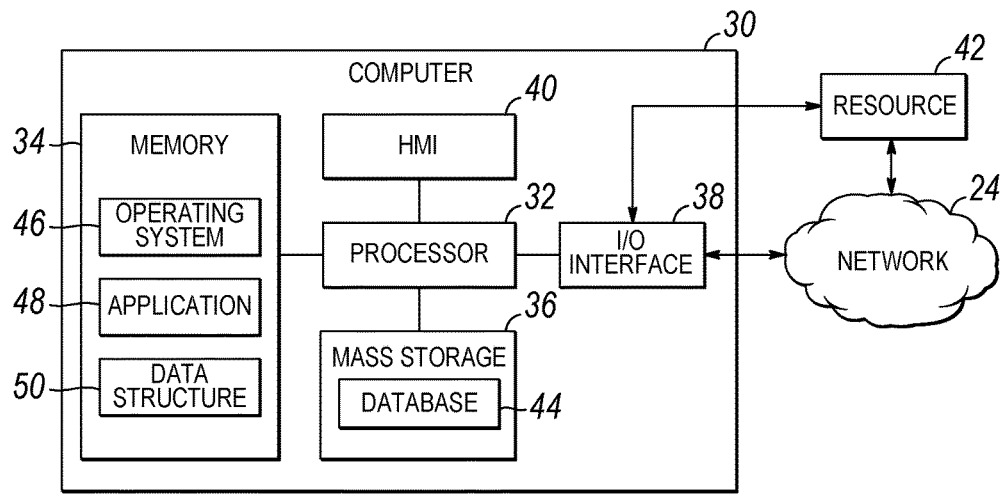
FIG. 3 is a diagrammatic view of an exemplary computing system of FIG. 1.
FIG. 5 is a diagrammatic view of an impacted PNR table including envelope identifiers that may be used by the process of FIG. 4 to identify portions of the history file corresponding to a previous re-accommodation.

Referring now to FIG. 3, the re-accommodation system 12, CRS 14, inventory system 16, ETS 18, DCS 20, and user system 22 of the processing and database apparatus 10 may be implemented on one or more computer devices or systems, such as exemplary computer system 30. The computer system 30 may include a processor 32, a memory 34, a mass storage memory device 36, an input/output (I/O) interface 38, and a Human Machine Interface (HMI) 40. The computer system 30 may also be operatively coupled to one or more external resources 42 via the network 24 or I/O interface 38. External resources may include, but are not limited to, servers, databases, mass storage devices, peripheral devices, cloud-based network services, or any other suitable computer resource that may be used by the computer system 30.

The processor 32 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in the memory 34. Memory 34 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 36 may include data storage devices such as a hard drive, optical drive, tape drive, volatile or non-volatile solid state device, or any other device capable of storing information.

The processor 32 may operate under the control of an operating system 46 that resides in memory 34. The operating system 46 may manage computer resources so that computer program code embodied as one or more computer software applications, such as an application 48 residing in memory 34, may have instructions executed by the processor 32. In an alternative embodiment, the processor 32 may execute the application 48 directly, in which case the operating system 46 may be omitted. One or more data structures 50 may also reside in memory 34, and may be used by the processor 32, operating system 46, or application 48 to store or manipulate data.

The I/O interface 38 may provide a machine interface that operatively couples the processor 32 to other devices and systems, such as the network 24 or external resource 42. The application 48 may thereby work cooperatively with the network 24 or external resource 42 by communicating via the I/O interface 38 to provide the various features, functions, applications, processes, or modules comprising embodiments of the invention. The application 48 may also have program code that is executed by one or more external resources 42, or otherwise rely on functions or signals provided by other system or network components external to the computer system 30. Indeed, given the nearly endless hardware and software configurations possible, persons having ordinary skill in the art will understand that embodiments of the invention may include applications that are located externally to the computer system 30, distributed among multiple computers or other external resources 42, or provided by computing resources (hardware and software) that are provided as a service over the network 24, such as a cloud computing service.

The HMI 40 may be operatively coupled to the processor 32 of computer system 30 in a known manner to allow a user to interact directly with the computer system 30. The HMI 40 may include video or alphanumeric displays, a touch screen, a speaker, and any other suitable audio and visual indicators capable of providing data to the user. The HMI 40 may also include input devices and controls such as an alphanumeric keyboard, a pointing device, keypads, push-buttons, control knobs, microphones, etc., capable of accepting commands or input from the user and transmitting the entered input to the processor 32.

A database 44 may reside on the mass storage memory device 36, and may be used to collect and organize data used by the various systems and modules described herein. The database 44 may include data and supporting data structures that store and organize the data. In particular, the database 44 may be arranged with any database organization or structure including, but not limited to, a relational database, a hierarchical database, a network database, or combinations thereof. A database management system in the form of a computer software application executing as instructions on the processor 32 may be used to access the information or data stored in records of the database 44 in response to a query, where a query may be dynamically determined and executed by the operating system 46, other applications 48, or one or more modules.

Figure 4:
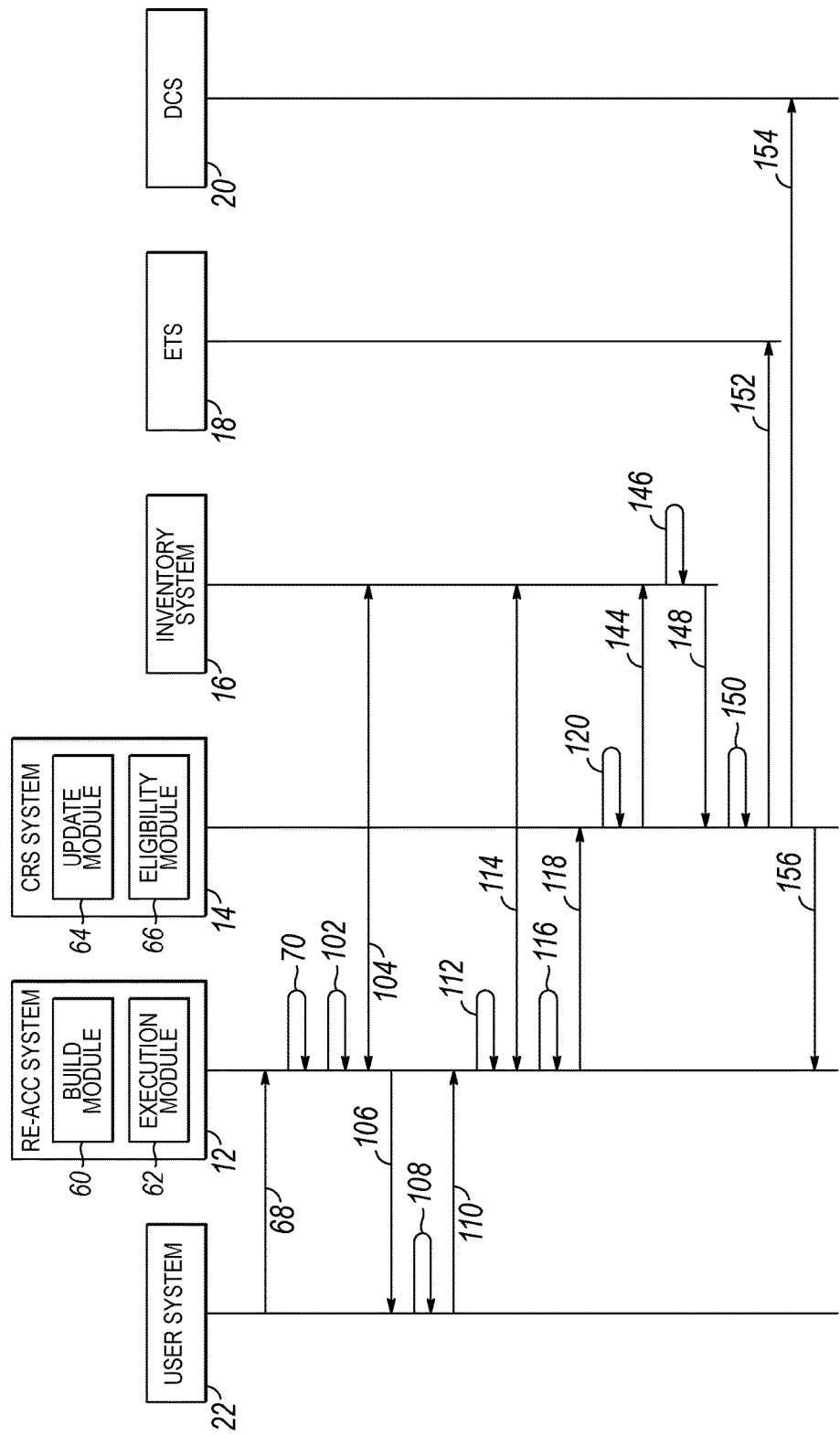
FIG. 4 is a sequence diagram depicting a process that may be implemented by one or more of the systems comprising the processing and database apparatus of FIG. 1 to build and execute a modifying re-accommodation.

Referring now to FIG. 4, the re-accommodation system 12 is depicted as including a build module 60 and an execution module 62, and the CRS 14 is depicted as including an update module 64 and an eligibility module 66. The modules 60, 62, 64, 66 are shown as distinct components, which may indicate the use of modular programming techniques. However, the software design may decrease the extent to which the modules 60, 62, 64, 66 are distinct by combining at least some program functions of multiple modules into a single module. Moreover, a person having ordinary skill in the art would understand that the functions attributed to the modules 60, 62, 64, 66 could be distributed in other ways, or on other systems than those depicted. Thus, embodiments of the invention are not limited to the specific arrangement of systems or modules shown in FIG. 4.

In response to receiving a request 68 to modify a previously executed re-accommodation, the re-accommodation system 12 may retrieve a report 70 associated with the previously executed re-accommodation. This report may be retrieved, for example, from the report database 13. The report may include data that can be used by the build module 60 to determine how to modify PNRs in the PNR database 15 to undo the previous re-accommodation. The build module 60 may also use the data to redo the previous re-accommodation by implementing a new solution that replaces the previous solution implemented by the previous re-accommodation.

The report may include a list of impacted segments replaced by the previous re-accommodation, one or more options implemented by the previous re-accommodation, and an impacted PNR table including a list of impacted PNRs and a list of corresponding identifiers, such as the envelope identification numbers shown. Each envelope identification number in the impacted PNR table may identify a portion of the PNRs history file that relates to modifications made by the previous re-accommodation. Each option in the report may include a list of one or more initial segments with routing, flight number, flight suffix, departure date, and timing. The initial segments may represent the initial travel itinerary of the traveler that was modified by the previous re-accommodation, and may include the impacted segment. Each option may also include a list of one or more replacement segments implemented by the previous re-accommodation, with routing, flight number, flight suffix, departure date, timing, previous class mapping, and from-to mapping.

Referring now to FIG. 5, an exemplary impacted PNR table 72 is presented. The impacted PNR table 72 may include a column 74 comprising the list of the record locators of each PNR impacted by the previous re-accommodation, and a column 76 comprising a list of corresponding envelope identifiers, such as the depicted envelope identity numbers. The data provided by the impacted PNR table 72 may be used by the re-accommodation system 12 to identify impacted PNRs and their history files. The options may then be built based on the report generated by the previous re-accommodation and the history files of the impacted PNRs.

Each re-accommodation may comprise one or more options that are implemented by the execution module 62. Each option may include data defining segments comprising the initial travel itinerary, actions to be performed on each segment, and one or more replacement segments that provide a solution to the scheduling change. Each option may be applied to a group of travelers that have booked the impacted flight, and may, upon execution, rebook the travelers using the specified solution. Each re-accommodation may comprise multiple options, each of which applies to a different set of impacted PNRs.

Figure 6:
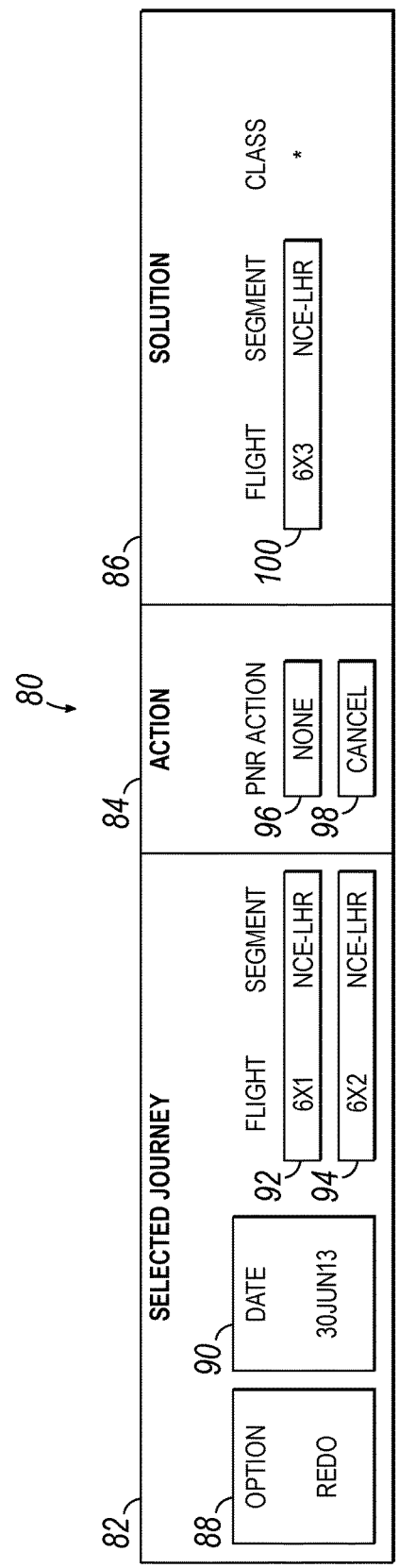
FIG. 6 is a diagrammatic view of an option that may be implemented by the process of FIG. 4 as part of the modifying re-accommodation.

By way of example, FIG. 6 depicts an exemplary option 80 that includes a selected journey field 82, an action field 84, and a solution field 86. The journey field 82 may include an option type field 88, a date field 90, and a plurality of segment fields 92, 94. The depicted option type field 88 includes the type identifier "REDO", which may indicate to the execution module 62 that the re-accommodation is intended to redo a previously executed re-accommodation by implementing an alternate solution. That is, the re-accommodation is "modifying" the previous re-accommodation rather than implementing a new re-accommodation.

The modifying re-accommodation may be based on the impacted segment that triggered the previous re-accommodation, since this data may be common to all PNRs impacted by the previous re-accommodation. To this end, data identifying the impacted segment may be included in segment field 92, and may provide a reference to the travel itinerary defined by the PNRs prior to execution of the previous re-accommodation. Because the impacted segment should have been deleted from the PNRs by the previous re-accommodation, no action on the PNR may be needed with respect to the impacted segment. This may be indicated by the indication "none" in the PNR action field 96 corresponding to segment field 92.

The option 80 may also include data identifying one or more replacement segments added by the previous re-accommodation in segment field 94. If a previous replacement segment is being replaced by a new replacement segment, a "cancel" instruction may be included in a PNR action field 98 corresponding to segment field 94. In the example depicted, this instruction may cause the execution module 62 to delete flight 6X2 from each PNR to which the option 80 is applied. The solution field 86 may include a segment field 100 that includes data identifying one or more new replacement segments (e.g., flight 6X3).

In some cases, the previous re-accommodation may have replaced a complete travel itinerary in the PNR. In this scenario, segments that were not impacted may nevertheless have been rebooked by the previous re-accommodation in order to remedy itineraries impacted by the schedule change. These additional segments may need to be taken into account (e.g., canceled) by the modifying re-accommodation. To this end, the option may include the segments in question in association with the PNR action "cancel". Upon execution of the re-accommodation, the solutions chosen by the user may be applied, and the non-impacted segments canceled by the previous re-accommodation reinstated.

In cases where non-impacted segments were deleted from the PNR by the previous re-accommodation, the build module 60 may evaluate the option to determine if the one or more segments selected by the user as the solution properly connects the reinstated segments. This evaluation may be performed by analyzing the travel itinerary that would result from implementing the solution. To this end, the build module 60 may determine if the travel itinerary to be implemented by the modifying re-accommodation connects the original origin and destination locations. If not, the build module 60 may generate an error. The build module 60 may also automatically select a new solution that produces a travel itinerary that connects the origin and destination locations.

If the previous re-accommodation has rebooked PNRs on another carrier, it may be necessary to verify that the carrier originating the modifying re-accommodation (e.g., the carrier providing the impacted segment) has the right to update the PNRs of the carrier operating the replacement segment.

If the impacted segment includes a negotiated space, the negotiated space may need to be created on the replacement segments. Negotiated space may refer to seats belonging to a specific class dedicated to the negotiated space. Passengers with tickets in the negotiated space may benefit from special conditions. A negotiate space may be obtained, for example, by a tour operator that resells the seats as part of a tour package. In this case, the negotiated space may be represented in a segment by a block of seats that can only be sold by the tour operator.

During a re-accommodation, blocks of negotiated space seats on the impacted segment may be transferred onto the replacement segments. If no blocks of the negotiated space exist on the replacement segment, blocks of the negotiated space may be created. In either case, in order for negotiated blocks to be merged, the negotiated blocks on the impacted segment may have to share at least some characteristics with the negotiated blocks on the replacement segments. For example, the negotiated blocks may require the same owner. In other cases, the size of an existing block of negotiated space may be increased to accommodate additional travelers being transferred from the impacted segment.

In the case of a modifying re-accommodation, the build module 60 may reinstate the negotiated space blocks present in the initial travel itineraries as they were before the previous re-accommodation. The build module 60 may then provide an option that transfers all corresponding travelers to the reinstated seats. If the impacted segment was canceled by the previous re-accommodation, the build module 60 may reinstate the initial blocks of negotiated space.

Modifying re-accommodations may encounter PNRs that include segments sold under a code-share agreement. A code-share agreement may refer to a business arrangement where two or more carriers publish and market a flight under their respective airline designator and flight number as part of their published time table or schedule. A seat may be purchased on any of the carrier designators and flight numbers, but the flight is actually operated by a subset of the carriers (e.g., a single carrier) referred to as the "operating carrier". The carriers that sell seats but do not operate the flights are referred to as "marketing carriers". Depending on how the operating carrier configures its CRS 14, a code-share PNR may be classified as a "single PNR", or as an "operating PNR".

In the case of a single PNR, the operating carrier PNR and marketing carrier PNR may be merged into the single PNR. Ownership of the single PNR and operational information may then be shared between the carriers. In contrast, an operating PNR may only contain operational carrier information. In this case, the operating PNR may need to be synchronized with a marketing PNR that contains marketing carrier information. Two procedures may be used to apply the changes on an operating PNR. One procedure may include canceling the operating PNR, which may trigger the marketing PNR to rebook the traveler on another flight. Another procedure may be to reach an agreement with the marketing carrier on the changes to perform, cancel and rebook the flight on the CRS of the operating carrier, and request the marketing carrier perform the corresponding action for the marketing PNR. In this instance, rebooking may be limited to flights within the same partnership.

In some cases, a rebooking error may occur during a re-accommodation. For example, the impacted segment may have been canceled in the PNR, but the replacement segment not added to the PNR, e.g., because the sale was refused by the CRS 14. In cases where the impacted segment was canceled and the replacement segment was not added, the modifying re-accommodation may create a specific option for the PNR. For these cases, the eligibility module 66 may be configured to skip checking of previous replacement segments for eligibility with regard to the modifying re-accommodation. The user may then be provided with an ability to choose a replacement solution, or to choose an UNDO option for the PNRs in error.

The modifying re-accommodation may need to take into account certain details of the previous re-accommodation in order to offer undo/redo capabilities. To this end, each impacted segment in the report may be associated with a list of options implemented to re-accommodate the impacted travel itinerary. Each option may list the impacted segments, the replacement segments, partnership information (e.g., for travel itineraries involving multiple carriers), and a list of PNRs re-accommodated by the option. In code-share cases, the partnership information may include data indicating which airline the traveler was booked on for the impacted segment. This categorization may facilitate identifying which PNRs have been updated by which option of the previous re-accommodation.

To create options for the modifying re-accommodation, the build module 60 may identify possible replacement segments. To this end, the build module 60 may analyze the impacted segment 102 and retrieve schedule data 104 from the inventory system 16. Based on this analysis, the build module 60 may create one or more options for re-accommodating each of the impacted travel itineraries. Each modifying option created may correspond to an option implemented by the previous re-accommodation, and may be configured to handle the travelers impacted thereby. There may also be some additional options created to handle error cases. The user may also have the ability to remove some options, that is, to choose not to undo/redo the previously implemented option for selected travelers.

Each option may comprise a solution (e.g., one or more replacement segments), and a set of PNRs impacted by the previous re-accommodation to which the solution defined by the option may be applied. Each option may also contain a list of initial flights (i.e., the flights including the impacted segment) with the corresponding action to be taken to implement the solution. These initial flights may correspond to both the previous initial travel itinerary and the previous replacement travel itinerary. After the options have been created, the options may be transmitted 106 to the user system 22 for display to the user.

The user may select one or more of the options 108 to create the modifying re-accommodation. Thus, the modifying re-accommodation may include one option or multiple options. Multiple options may be necessary, for example, due to some options not being applicable to all of the impacted travel itineraries. Each option may identify a group of passengers having itineraries that, prior to the previous re-accommodation, included the impacted segment, and a specific solution for rebooking the travel itineraries. Each option may include the initial travel itinerary (i.e., the travel itinerary including the impacted segment) with routing, flight number, flight suffix, and departure date, the previous replacement travel itinerary with cancel action, and a new replacement travel itinerary with routing, flight number, flight suffix, departure date, timing, from-to mapping, and class mapping.

To facilitate creation of modifying re-accommodations that affect large numbers of travel itineraries, the options comprising the modifying re-accommodation may be pre-built automatically by the build module 60 using data retrieved from the report. The build module 60 may provide the user with several selectable alternatives for creating each option. These alternatives may include, for example, automatic flight search, delete flight, revert, and no action.

Selecting automatic flight search may cause the build module 60 to find new replacement flights, and create an option that replaces the previous replacement flight with one of the new replacement flights. Selecting delete flight may cause the build module 60 to create an option that cancels the previous replacement segments without replacing the segments. Selecting revert may cause the build module 60 to create an option that replaces the previous replacement segments with the impacted segments. That is, revert may simply undo the previous re-accommodation by modifying the PNR from its current state to the state the PNR was in prior to the previous re-accommodation. Selecting "no action" may cause the build module 60 to set a flag, or otherwise provide an indication to the execution module 62 that the PNR in question should not be altered, or that the PNR requires manual intervention.

The modifying re-accommodation may be based on the initial travel itinerary rather than the previous replacement travel itinerary. That is, the modifying re-accommodation may be implemented as if the previous re-accommodation did not occur. To this end, the class mapping may be based on the initial travel itinerary. In this way, the build module may define an updated travel itinerary with a closest available class and a closest available level of service to the initial travel itinerary.

The new replacement travel itinerary may comprise one or more segments matching the initial routing of the traveler, or another routing connecting the boarding point and the disembarkation point. Once the user has selected a solution for each option comprising the modifying re-accommodation, the user may instruct the user system 22 to transmit a commit message 110 to the re-accommodation system 12.

In response to receiving the commit message 110, the execution module 62 may validate the re-accommodation 112. Validation may include validating the options comprising the modifying re-accommodation prior to updating PNRs in the PNR database 15. The execution module 62 may also launch a query 114 to the inventory system 16 that checks the options being implemented against the carrier schedule. Validating each option may prevent the execution module 62 from attempting to implement a re-accommodation that creates scheduling problems. Validation may also identify PNRs that have been altered subsequent to execution of the previous re-accommodation, which could cause undesired results.

The execution module 62 may validate each option by verifying that both the replacement segments being implemented by the modifying re-accommodation, and the replacement segments implemented by the previous re-accommodation, still exist from a schedule standpoint with the same routing. The existence of the previous replacement segments may be indicative of whether the PNR has been modified since the previous re-accommodation. For example, if there was a change in the routing of a flight including the replacement segments after the previous re-accommodation, the PNR may have been manually modified, or an intervening re-accommodation may have been executed. In this case, the PNRs including the replacement segment may have been updated with a new replacement travel itinerary since the previous re-accommodation. In response to the execution module 62 determining that the replacement segments of the PNR may have been modified subsequent to the previous re-accommodation, the execution module 62 may block or abort execution of the modifying re-accommodation with respect to these PNRs.

In some cases, re-accommodations may be executed as batches based on flight date. If the validation fails on a specific flight date, the flight date may be discarded and unlocked, and the validation attempted for PNRs having a different flight date, e.g., the following day. If more than a predetermined number of flight dates are discarded, the re-accommodation may be stopped, and an error reported. If validation is successful for the other flight dates, these other flight dates of the period may be processed, and the flight dates in error reported. The user may then manually modify PNRs for the problematic flight dates at a later time. Each carrier may set the predetermined number of flight dates that triggers stoppage of the re-accommodation. This predetermined number may be set to limit the amount of manual handling required by correcting errors in a faulty re-accommodation before launching the re-accommodation for an entire flight period.

Once the options have been validated, the execution module 62 may execute the modifying re-accommodation 116. The execution module 62 may implement the modifying re-accommodation at one of a plurality of different levels. Levels may be defined, for example, so that the modifying re-accommodation processes all travel itineraries including the impacted segment over an entire flight period, or processes only itineraries having the impacted segment on a given flight date. The amount of time and system resources required to execute a re-accommodation may depend on the number of PNRs impacted, and the number of flight dates being re-accommodated. To discretize execution of a re-accommodation for impacted flights occurring over a period of time, the execution module 62 may categorize the PNRs by the flight date of the impacted segment. The re-accommodation may then be executed in parallel for the categorized PNRs based on flight date. This may permit updating database files for flight dates within the period while the re-accommodation is being executed.

The execution module 62 may trigger execution of the modifying re-accommodation in the CRS 14 by transmitting a select impacted PNRs request 118. The select impacted PNRs request 118 may include the options to be implemented, record locators identifying the impacted PNRs, and envelope identifiers. The envelopes identified by the identifiers may correspond to portions of the history files relating to the previous re-accommodation. In response to receiving the select impacted PNRs request 118, the eligibility module 66 may determine an eligibility of each of the impacted PNRs, and transmit a reception acknowledgement to the re-accommodation system 12.

Figure 7:
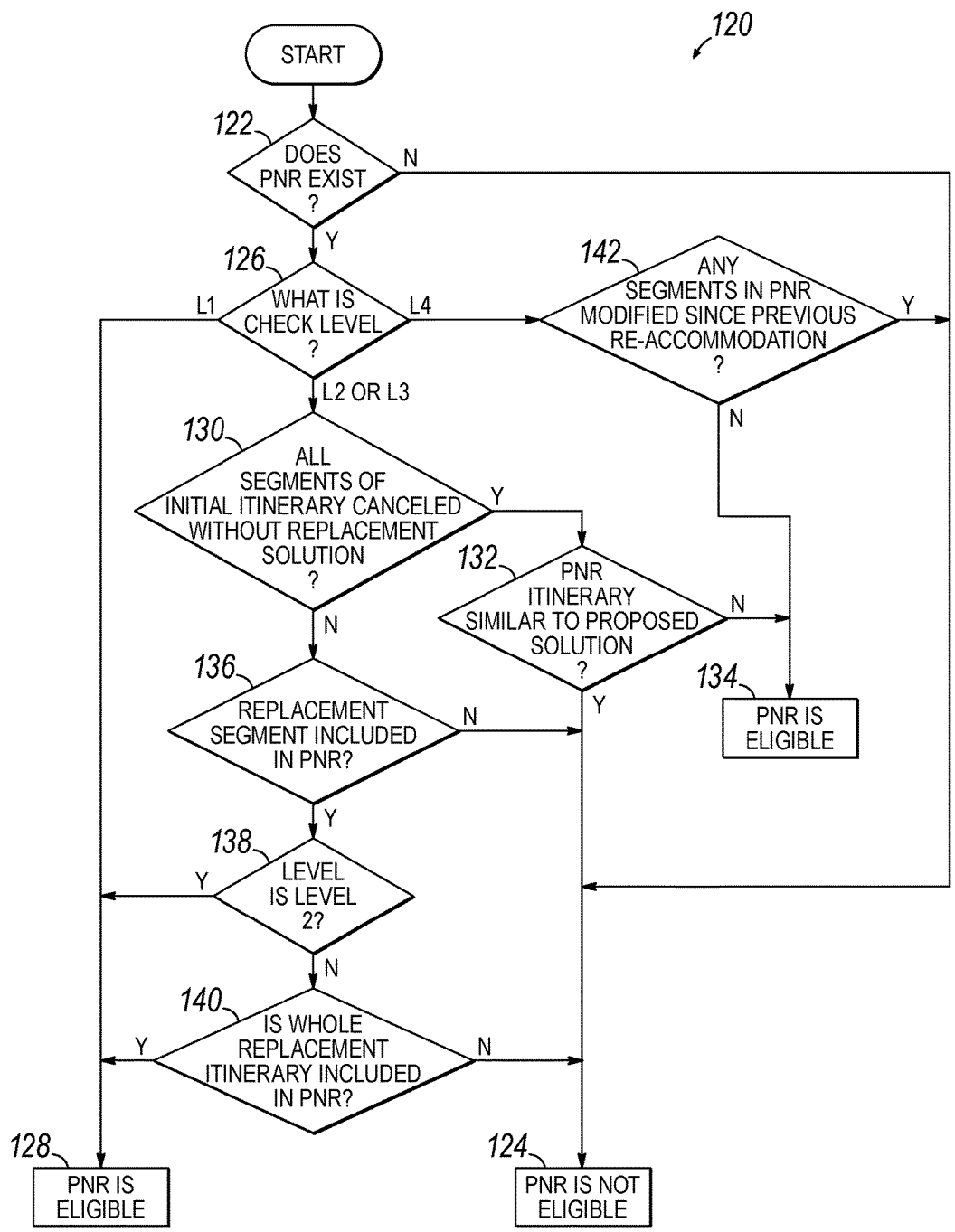
FIG. 7 is a flow-chart illustrating a process that may be executed to determine eligibility of a PNR to be modified by the modifying re-accommodation of FIG. 4.

Referring now to FIG. 7, a flow-chart is shown depicting a process 120 that may be performed by the eligibility module 66 to determine the eligibility of each impacted PNR to be modified by the modifying re-accommodation. Process 120 may be applied to each PNR in the list of impacted PNRs received by the eligibility module 66. Depending on a "check level" being applied by the eligibility module 66, the current state of the previous replacement segment, and the previous travel itinerary, as many as all of the initial segments, or as few as none of the initial segments of the PNR being re-accommodated may need to be the same as they were immediately after the previous re-accommodation. In addition, the process 120 may be provided with data identifying the previous replacement segments in each PNR so that the process 120 can determine if the PNR is eligible for processing by the modifying re-accommodation.

In some cases (ie: the previous re-accommodation meant to cancel the initial flights only with no replacement) the previous segments may not exist. In these cases, the PNR may be kept. If the previous replacement segments cannot be identified, the process 120 may discard the corresponding PNR and report this action to the user.

In block 122, the process 120 may determine if the PNR identified by the record locator still exists in the PNR database 15. If the PNR does not exist ("NO" branch of decision block 122), the process 120 may proceed to block 124 and determine that the PNR is not eligible for modification by the modifying re-accommodation. If the PNR does exist ("YES" branch of decision block 122), the process may proceed to block 126.

In block 126, the process 120 may determine a "check level" that is to be applied to the PNR. The check level may be one of a plurality of levels (e.g., four levels) applied to determine how rigorously the PNR is evaluated for eligibility. The level applied may depend on a requirement set by the carrier, and may be adjustable for each re-accommodation modified. In the exemplary embodiment shown, if level one is being applied ("L1" branch of decision block 126), the process 120 may proceed to block 128 and determine that the PNR is eligible for modification. Thus, under the exemplary level one, all existing PNRs impacted by the previous re-accommodation are eligible for modification by the modifying re-accommodation, even if the PNR was modified since execution of the previous re-accommodation.

If level two or level three is being applied ("L2/L3" branch of decision block 126), the process 120 may proceed to block 130. Level two may be applied if the PNR still includes the solution implemented by the previous re-accommodation. That is, if the current travel itinerary includes the one or more replacement segments added by the previous re-accommodation. This determination may be made by comparing the airline code, flight number and suffix, departure date, origin and destination locations, and class of reservation for the replacement segment retrieved from the PNR history file with the corresponding data in the PNR.

Level three may require that all segments comprising the travel itinerary of the PNR be unchanged since the previous re-accommodation was executed. Thus, in contrast to level two, which may only require that the one or more replacement segments be checked for changes, level three may require that all the segments contained in the travel itinerary be checked for modifications to the airline code, flight number and suffix, departure date, origin and destination locations, class of reservation, or timing. Timings may be checked on the initial itinerary excluding the impacted flight. Level three may be configured to protect a traveler that is booked in a whole travel itinerary that contains the replacement flight.

In block 130, the process 120 may determine if all the segments comprising the initial travel itinerary of the PNR (i.e., the travel itinerary before execution of the previous re-accommodation) have been canceled without a replacement solution being selected and booked in the previous accommodation. This determination may be made, for example, based on the envelope identification number and data in the history file of the PNR. If all the segments of the initial travel itinerary have been canceled without a replacement solution being booked ("YES" branch of decision block 130), the process 120 may proceed to block 132.

In block 132, the process 120 may determine if the travel itinerary defined by the PNR is similar to the travel itinerary proposed by the modifying re-accommodation. In some cases, the previous re-accommodation may have been unable to identify an alternative travel itinerary for the PNR. Under this scenario, all segments of the impacted travel itinerary may have been canceled by the previous re-accommodation. For these PNRs, it may not be possible for the process 120 to perform a level two or level three check on the PNR, since no replacement segments have been booked by the previous re-accommodation. In this case, the process 120 may determine whether the PNR includes a travel itinerary that is at least similar to the expected travel itinerary which would be produced by executing the modifying re-accommodation. The process 120 may determine that the current travel itinerary defined by the PNR is similar to the expected travel itinerary if the current and expected travel itineraries each include a similar origin and destination location, and a similar date. "Similar" origin and destination locations may be selected by the carrier at an airport level (the origination and destination airports must be the same e.g., JFK to LHR), a city level (the origination and destination airports must serve the same city, e.g., JFK or LGA to LHR or LTN), or a country level (the origination and destination airports must serve the same country e.g., United States to England). A similar date may be considered to be a segment departing on the same day, or a predetermined number of days before or after the departure date of the impacted segment.

If the travel itinerary of the PNR contains similar origin and destination locations, and a similar date as the travel itinerary proposed by the modifying re-accommodation, the process 120 may determine that travel itineraries are similar ("YES" branch of decision block 132). The process 120 may then proceed to block 124 and determine that the PNR is not eligible for modification by the modifying re-accommodation. This decision may be supported by a likelihood that a PNR having a similar travel itinerary to the proposed solution has been manually updated by an agent. The process 120 may thereby preserve these manually corrected PNRs. If the travel itinerary of the PNR is not similar to the travel itinerary proposed by the modifying re-accommodation ("NO" branch of decision block 132), the process 120 may proceed to block 134 and determine that the PNR is eligible for modification.

Returning to block 130, if the process 120 determines that all the segments of the initial travel itinerary were not canceled without replacement segments being booked by the previous re-accommodation ("NO" branch of decision block 130), the process 120 may proceed to block 136. In block 136, the process 120 may determine if the one or more replacement segments defined by the previous re-accommodation are present in the current travel itinerary defined by the PNR. If the one or more replacement segments are not present ("NO" branch of decision block 136), the process 120 may proceed to block 124 and determine that the PNR is not eligible for modification by the modifying re-accommodation.

If the one or more replacement segments defined by the previous re-accommodation are present ("YES" branch of decision block 136), the process 120 may proceed to block 138 and determine if level two or level three is being applied to the PNR. If level two is being applied ("YES" branch of decision block 138), the process 120 may proceed to block 128 and determine that the PNR is eligible for modification by the modifying re-accommodation. If level two is not being applied ("NO" branch of decision block 138), the process 120 may proceed to block 140.

In block 140, the process 120 may determine if the whole replacement travel itinerary installed by the previous re-accommodation is still present in the PNR. That is, are all of the segments of the replacement travel itinerary (and the segments connected thereto) present in the PNR. If the whole replacement travel itinerary is not present ("NO" branch of decision block 140), the process 120 may proceed to block 124 and determine that the PNR is not eligible for modification by the modifying re-accommodation. If the whole replacement travel itinerary is present ("YES" branch of decision block 140), the process 120 may proceed to block 128 and determine that the PNR is eligible for modification by the modifying re-accommodation.

Returning to block 126, if level four is being applied ("L4" branch of decision block 126), the process 120 may proceed to block 142. Under level four, the process 120 may determine the PNR is ineligible for modification by the modifying re-accommodation if there is a difference between the current state of the PNR and the state of the PNR immediately after the previous re-accommodation. If no segments in the PNR have been added, updated, or canceled since the previous re-accommodation, the process 120 may determine that there is no difference between the current state of the PNR and the state of the PNR immediately after the previous re-accommodation. To this end, the process 120 may analyze the history file of the PNR to verify that no segments have been added, updated, or canceled. The analysis may include examining envelopes added to the history file subsequent to the envelope identified by the identification number in the impacted PNR table 72. The analysis may be performed by a sub-process that parses the envelopes of the history file and verifies that the segments comprising the travel itinerary of the PNR have not been impacted by actions subsequent to execution of the previous re-accommodation.

In certain embodiments of the invention, if the PNR was modified multiple times by the previous re-accommodation (e.g., in cases where duplicate segments are present in the PNR), each modification may be considered separately by the modifying re-accommodation. Moreover, if the PNR has been split between the previous re-accommodation and the modifying re-accommodation, the parent and child PNRs may be separately evaluated for eligibility by the process 120.

With continued reference to FIG. 4, in response to the CRS 14 selecting and determining the eligibility of the impacted PNRs, the update module 64 may transmit an update inventory request 144 to the inventory system 16. The update inventory request 144 may include the eligible PNRs and instructions relating to updating the inventory. In response to receiving the update inventory request 144, the inventory system 16 may update inventories relating to bookings, seats, and services 146 in accordance with the replacement travel itineraries implemented by the modifying re-accommodation.

In response to updating the inventories, the inventory system 16 may transmit a synchronize PNRs request 148 to the update module 64. The synchronize PNRs request 148 may include data relating to the booked segments and services that were updated in the inventory database 17. In response to receiving the synchronize PNRs request 148, the update module 64 may execute instructions 150 that update the impacted PNRs in the PNR database 15 to reflect the modifications to the travel itinerary, including changed segments and services.

The one or more replacement segments and PNR eligibility checks may be based on travel itinerary analysis performed at a segment level. To account for changes in SSRs, tickets, or DCS data, the update module 64 may include a "segment mapping" feature. Segment mapping may provide logic that maps each segment of the solution to a segment of the impacted travel itinerary so that the re-accommodated travel itinerary includes the same level of services, e.g., booking classes, SSRs, seats, and segment status. The mapping logic may include class mapping logic, status mapping logic, and service mapping logic.

In a modifying re-accommodation, the travel itinerary being updated may comprise one or more initial segments and one or more replacement segments. To preserve the original services, and avoid any degradation in service from the re-accommodated travel itinerary, the update module 64 may map the solution of the modifying re-accommodation to both the initial segments and the replacement segments.

Class mapping logic may determine the classes of the solution segments for each PNR using the segment mapping logic described above. To determine the class of the solution, the segment mapping logic may take into account the classes of the initial segments. In case of a modifying re-accommodation that reverses or undoes the previous re-accommodation (i.e., that reinstates the initial travel itinerary), the traveler may be booked in the same class as before the previous re-accommodation.

Class information for the initial segments may be unavailable in the PNR, since the initial segments may have been canceled by the previous re-accommodation. Thus, it may be necessary to retrieve class information from the history file of the PNR using the envelope identifier to identify the previous segment information. The logic used to map class status may also be used to determine statuses and seats.

In some cases, one or more services that were included in the initial travel itinerary may have been lost by the previous re-accommodation. One or more services may have also been added after the previous re-accommodation that were not included in the initial travel itinerary. To ensure that both lost services and added services are accounted for by the modifying re-accommodation, the update module 64 may compare services between the initial travel itinerary and the previous replacement travel itinerary to identify lost services. The update module 64 may then compare services between the previous replacement travel itinerary and the current travel itinerary to identify services added since the previous re-accommodation. The update module 64 may then request the lost services and the added services be included in the new replacement travel itinerary. To this end, when reprocessing services, the from/to mapping logic may be called twice. The first call may determine differences in services between the initial segments and the replacement segments, and the second call may determine differences in services between the replacement segments added by the previous re-accommodation and the replacement segments being added by the modifying re-accommodation. These differences may include the presence or absence of a service in the travel itinerary before or after the previous re-accommodation.

The update module 64 may transmit one or more e-ticket update requests 152 to the ETS 18 to update the e-ticket database 19. An e-ticket update request 152 may be transmitted each time a PNR is updated by the update module 64, or the e-ticket update request 152 may include instructions for updating e-tickets relating to a batch of PNR updates. Each e-ticket may be maintained at the passenger level in the e-ticket database 19, and may include an electronic coupon for each segment in the PNR. Each e-ticket may also include a coupon, or be associated with an EMD or other electronic document identifying each purchased service. These electronic documents may also be associated with one or more of the segments. The update module 64 may be configured to maintain links between segments in the PNR and coupons comprising the corresponding e-ticket, and links between purchased service identified in the PNR and corresponding EMDs stored in the e-ticket database.

The update module 64 may apply logic similar to that used to update the segments to transfer purchased services and their corresponding coupons in the e-ticket database 19. The processing logic applied by the update module 64 may depend on the result of the previous re-accommodation. To ensure that the segments, services, tickets, and EMDs are associated correctly upon completion of the modifying re-accommodation, the logic applied may depend on whether the modifying re-accommodation is undoing the previous re-accommodation (e.g., restoring the database files associated with the PNR to the state the database files were in prior to execution of the previous re-accommodation), or is redoing the re-accommodation (e.g., updating the state of the database files associated with the PNR to reflect replacement of a segment added by the previous re-accommodation or otherwise implement a new solution).

The update module 64 may determine, for each PNR being processed, if the corresponding e-ticket was revalidated during the previous re-accommodation. If the e-ticket was revalidated by the previous re-accommodation, the update module 64 may attempt to revalidate the e-ticket using the travel itinerary from the initial PNR. In contrast, if a replacement e-ticket was issued during the previous re-accommodation, the update module 64 may attempt to void the replacement e-ticket and re-associate the previous e-ticket with the segments comprising the initial travel itinerary. In an embodiment of the invention, voiding may only be attempted by the update module 64 if the modifying re-accommodation is being processed in the same processing period as the previous re-accommodation, e.g., on the same day. This timing issue may be based on when billing data relating to the replacement e-ticket is sent to a Billing Service Provider (BSP) or other third-party processing system. That is, it may not be possible to void the ticket after the BSP receives billing data for the ticket.

If the replacement e-ticket cannot be voided, the update module 64 may reissue or exchange the pending e-ticket by causing a new e-ticket to be issued with the details of the one or more initial segments. In some cases, the pending e-ticket in the e-ticket database 19 may not have been modified by the previous re-accommodation. This may occur, for example, if reprocessing errors prevented the initial e-ticket from being updated. If the pending e-ticket was not modified by the previous re-accommodation, there may not be a need to update the pending e-ticket, and the update module 64 may simply re-associate the pending e-ticket with the booked segments in the PNR.

In cases where the modifying re-accommodation is redoing the previous re-accommodation, and the e-ticket was revalidated during the previous re-accommodation, the update module 64 may attempt to revalidate or re-issue the e-ticket with the revised segments. In contrast, if the modifying re-accommodation is redoing the previous re-accommodation, and the e-ticket was reissued during the previous re-accommodation, the update module 64 may attempt to void the pending e-ticket and revalidate or re-issue the e-ticket with the segments comprising the modified travel itinerary. If the e-ticket cannot be voided, the update module 64 may re-issue the e-ticket in accordance with the modified travel itinerary in the PNR. If the pending e-ticket in the e-ticket database 19 was not modified by the previous re-accommodation, the update module 64 may attempt to revalidate or re-issue the e-ticket in accordance with the modified travel itinerary in the PNR.

In each of the above described scenarios, the update module 64 may use e-ticket data associated with previous replacement segments, or taken from the history file. Re-issue may be attempted when revalidation is not possible. The decision to re-issue or revalidate each e-ticket may be based on rules defined by the carrier. For example, revalidation may not be possible if the modifying re-accommodation is changing routing, class, or the operating carrier.

EMDs may be processed based on the outcome of the service and e-ticket reprocessing. In response to confirming a purchased service, the update module 64 may re-associate the EMD with the e-ticket if the e-ticket is revalidated. If the e-ticket is re-issued rather than revalidated, the update module 64 may re-issue the EMD and associate the re-issued e-ticket with the EMDs corresponding to the confirmed services. If the pending e-ticket is voided, the EMDs associated with the pending ticket may also be voided, and the EMDs associated with the initial e-ticket reinstated. EMDs corresponding to newly added services in the PNR may be associated with the resulting e-ticket in the e-ticket database 19. However, if a service is not confirmed, the corresponding EMD may be de-associated from the e-ticket.

The update module 64 may transmit one or more DCS update requests 154 to the DCS 20. The update module 64 may transmit the DCS update requests 154 while updating the PNRs (e.g., each time a PNR is updated), or upon completion of all or a portion of the PNR updates. In any case, the DCS update requests 154 may include instructions for updating files in the DCS database 21. The DCS 20 may transmit results of the instructions to the CRS 14 to confirm that the updates have been processed.

The processing logic for updating the DCS 20 for data transfer and passenger re-acceptance may be based on the previous replacement segments. That is, the update module 64 may update the DCS 20 based on the travel itinerary in the PNR prior to execution of the modifying re-accommodation based on a presumption that the files in the DCS database 21 reflect the previous re-accommodation. If a process implemented to execute the previous re-accommodation failed, the update module 64 may attempt to merge the current DCS update request 154 with a previous request to update the DCS 20 associated with the previous re-accommodation. The resulting merged request may enable the files in the DCS database 21 to be updated directly from the initial travel itinerary to the travel itinerary as modified by the modifying re-accommodation.

The update module 64 may transmit a report 156 to the re-accommodation system 12 for inclusion in a re-accommodation report. The report may include data characterizing the actions taken to execute the re-accommodation, and may organize data relating to re-accommodations using a hierarchical structure to facilitate building and execution of subsequent modifying re-accommodations. To this end, data relating to impacted segments, options implemented by the re-accommodation, and the impacted PNR table may be included in the saved report. The impacted PNR table may enable modules implementing modifying re-accommodations to identify the portion of the history file corresponding to the previously executed re-accommodation for each PNR in the PNR database 15. This may be accomplished by associating an envelope identifier with each PNR impacted by the re-accommodation. The impacted PNR table may facilitate obtaining data relating to booking and services that need to be processed to implement the modifying re-accommodation. In cases where the modifying re-accommodation is applied to an entire flight period, the update module 64 may generate a progress status that tracks advancement of each flight date. Each flight date may also be reported and linked to a report for each corresponding flight period.

To enable users to build and implement re-accommodations, the respective modules may provide a plurality of interfaces to the user via the user system 22. These interfaces may include a "launch re-accommodation from report" interface, or RFR interface. The RFR interface may provide the user with a plurality of selectable previously executed re-accommodations. In response to the user selecting one of the previously executed re-accommodations, the RFR interface may display a selectable list of passengers. The selectable list of passengers may enable the user to execute a modifying re-accommodation for just a selected set of passengers or PNRs subjected to the previous re-accommodation. In response to the user selecting the executed re-accommodation (and if applicable, the set of impacted passengers), the corresponding files may be provided to the re-accommodation system 12. Options may then be generated and the re-accommodation built as described previously.

While a re-accommodation is being built, the re-accommodation system 12 may query the CRS 14 to determine if the selected segments are valid. Based on the responses received from the CRS 14, the user system 22 may display the validity of each schedule. The user may thereby adjust the options selected based on the validity of the underlying schedules.

A commit RFR interface may provide the user with an interface for selectively instructing the re-accommodation system 12 to commit to execution of the selected re-accommodation. If the re-accommodation is correctly validated and built, the commit RFR interface may provide a confirmation the re-accommodation was executed.

In general, the routines executed to implement the embodiments of the invention, whether implemented as part of an operating system or a specific application, component, program, object, module or sequence of instructions, or even a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations and/or elements embodying the various aspects of the embodiments of the invention. Computer-readable program instructions for carrying out operations of the embodiments of the invention may be, for example, assembly language or either source code or object code written in any combination of one or more programming languages.

Various program code described herein may be identified based upon the application within that it is implemented in specific embodiments of the invention. However, it should be appreciated that any particular program nomenclature that follows is used merely for convenience, and thus the invention should not be limited to use solely in any specific application identified and/or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of information, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatus, or other devices to function in a particular manner, such that the instructions stored in the computer-readable medium produce an article of manufacture including instructions that implement the functions, acts, and/or operations specified in the flow-charts, sequence diagrams, and/or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, and/or operations specified in the flow-charts, sequence diagrams, and/or block diagrams.

In certain alternative embodiments, the functions, acts, and/or operations specified in the flow-charts, sequence diagrams, and/or block diagrams may be re-ordered, processed serially, and/or processed concurrently consistent with embodiments of the invention. Moreover, any of the flow-charts, sequence diagrams, and/or block diagrams may include more or fewer blocks than those illustrated consistent with embodiments of the invention.

The terminology used herein is for the purpose of describing particular embodiments only and is not intended to be limiting of the embodiments of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Furthermore, to the extent that the terms "includes", "having", "has", "with", "comprised of", or variants thereof are used in either the detailed description or the claims, such terms are intended to be inclusive in a manner similar to the term "comprising".

While all of the invention has been illustrated by a description of various embodiments and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. An apparatus for updating one or more databases modified by a first re-accommodation, the apparatus comprising:
   one or more processors; and
   a memory coupled to the one or more processors, the memory storing a plurality of data structures comprising a first database of reports, a second database of passenger name records, and program code that, when executed by at least one of the one or more processors, causes the apparatus to:

receive a first request to execute a second re-accommodation that modifies the first re-accommodation;

in response to receiving the first request, retrieve a report associated with the first re-accommodation from the first database, the report including a record locator that identifies a passenger name record modified by the first re-accommodation and an identifier that identifies a first envelope of a plurality of envelopes comprising a history file of the passenger name record;

identify, based on the record locator, the passenger name record in the second database, the passenger name record being in a first state that represents a current status of the passenger name record;

identify, based on the identifier, a portion of the history file corresponding to a modification made to the passenger name record by the first re-accommodation;

determine, based on the portion of the history file, a second state of the passenger name record that represents a first previous status of the passenger name record before the first re-accommodation;

determine, based on the first request, a third state of the passenger name record that represents a desired status of the passenger name record after execution of the second re-accommodation; and modify, based on the second state, the passenger name record from the first state to the third state.

2. The apparatus of claim 1 wherein the passenger name record includes one or more first segments when in the second state, and the program code is further configured to cause the apparatus to:

in response to a change in the one or more first segments, receive a second request to execute the first re-accommodation;

in response to receiving the second request, identify the passenger name record in the first database as including the one or more first segments;

modify the passenger name record from the second state to a fourth state by deleting the one or more first segments from the passenger name record;

add the first envelope to the history file, the first envelope including data defining the modification made to the passenger name record by the first re-accommodation and the fourth state of the passenger name record;

generate the report that includes the record locator and the identifier; and store the report in the first database, wherein the fourth state is the same as the first state if no modifications are made to the passenger name record between modifying the passenger name record to the fourth state and receiving the first request.

3. The apparatus of claim 1 wherein the program code is further configured to cause the apparatus to:

determine, based on the portion of the history file, a fourth state of the passenger name record that represents a second previous status of the passenger name record immediately after the first re-accommodation; and comparing the first state and the fourth state to determine if the fourth state differs from the first state, wherein the passenger name record is only modified from the first state to the third state if the first state and the fourth state do not differ.

4. The apparatus of claim 1 wherein modifying the passenger name record from the first state to the third state includes deleting one or more first segments in the passenger name record, and the program code is further configured to cause the apparatus to:

add one or more second segments to the passenger name record.

5. The apparatus of claim 1 wherein the report further includes a first list of one or more segments impacted by the first re-accommodation, a second list of one or more options for re-accommodating each segment impacted, and the passenger name record is one of a plurality of passenger name records comprising a third list of passenger name records impacted by the first re-accommodation.

6. The apparatus of claim 1 wherein the program code is further configured to cause the apparatus to:

in response to determining a first service is present in the passenger name record when the passenger name record is in the second state and the first service is absent in the passenger name record when the passenger name record is in the first state, include the first service in the passenger name record in the third state.

7. A method of updating one or more databases modified by a first re-accommodation, the method comprising:

receiving, at a computer, a first request to execute a second re-accommodation that modifies the first re-accommodation;

in response to receiving the first request, retrieving, by the computer from a first database, a report associated with the first re-accommodation, the report including a record locator that identifies a passenger name record modified by the first re-accommodation and an identifier that identifies a first envelope of a plurality of envelopes comprising a history file of the passenger name record;

identifying, by the computer based on the record locator, the passenger name record in a second database, the passenger name record being in a first state that represents a current status of the passenger name record;

identifying, by the computer based on the identifier, a portion of the history file corresponding to a modification made to the passenger name record by the first re-accommodation;

determining, by the computer based on the portion of the history file, a second state of the passenger name record that represents a first previous status of the passenger name record before the first re-accommodation;

determining, by the computer based on the first request, a third state of the passenger name record that represents a desired status of the passenger name record after execution of the second re-accommodation; and modifying, by the computer based on the second state, the passenger name record from the first state to the third state.

8. The method of claim 7 wherein the passenger name record includes one or more first segments when in the second state, and further comprising:

in response to a change in the one or more first segments, receiving a second request to execute the first re-accommodation;

in response to receiving the second request, identifying the passenger name record in the first database as including the one or more first segments;

modifying the passenger name record from the second state to a fourth state by deleting the one or more first segments from the passenger name record;

adding the first envelope to the history file, the first envelope including data defining the modification made to the passenger name record by the first re-accommodation and the fourth state of the passenger name record;

generating the report that includes the record locator and the identifier; and storing the report in the first database, wherein the fourth state is the same as the first state if no modifications are made to the passenger name record between modifying the passenger name record to the fourth state and receiving the first request.

9. The method of claim 7 further comprising:

determining, based on the portion of the history file, a fourth state of the passenger name record that represents a second previous status of the passenger name record immediately after the first re-accommodation; and comparing the first state and the fourth state to determine if the fourth state differs from the first state, wherein the passenger name record is only modified from the first state to the third state if the first state and the fourth state do not differ.

10. The method of claim 9 wherein comparing the first state and the fourth state comprises:

determining if the history file of the passenger name record includes a second envelope added after the first envelope, wherein the first state and the fourth state differ if the second envelope includes data that modifies one or more first segments in the passenger name record.

11. The method of claim 10 wherein the data modifies the one or more first segments by changing at least one of an airline code, a flight number and suffix, a departure date, an origin, a destination, a class of reservation, or a timing of the one or more first segments.

12. The method of claim 10 wherein the one or more first segments replaced one or more second segments deleted from the passenger name record by the first re-accommodation.

13. The method of claim 7 wherein modifying the passenger name record from the first state to the third state includes deleting one or more first segments in the passenger name record, and further comprising:

adding one or more second segments to the passenger name record.

14. The method of claim 13 further comprising:

identifying an electronic ticket corresponding to the passenger name record in a third database; and re-issuing the electronic ticket in the third database to include one or more coupons associated with the one or more second segments.

15. The method of claim 13 further comprising:

identifying a passenger name associated with the one or more first segments in the passenger name record; and transferring, in a third database of a departure control system, departure control data associated with the passenger name from a first database file associated with the one or more first segments to a second database file associated with the one or more second segments.

16. The method of claim 7 wherein the report further includes a first list of one or more segments impacted by the first re-accommodation, a second list of one or more options for re-accommodating each segment impacted, and the passenger name record is one of a plurality of passenger name records comprising a third list of passenger name records impacted by the first re-accommodation.

17. The method of claim 7 further comprising:

in response to determining a first service is present in the passenger name record when the passenger name record is in the second state and the first service is absent in the passenger name record when the passenger name record is in the first state, including the first service in the passenger name record in the third state.

18. The method of claim 17 further comprising:

identifying an electronic ticket associated with the passenger name record in a third database; and adding an electronic document to the third database indicating that the first service has been purchased.

19. The method of claim 17 further comprising:

in response to determining a second service is present in the passenger name record when the passenger name record is in the first state and the second service is absent in the passenger name record when the passenger name record is in the second state, including the second service in the passenger name record in the third state.

20. A computer program product for updating one or more databases modified by a first re-accommodation, the computer program product comprising:

a non-transitory computer-readable storage medium; and program code stored on the non-transitory computer-readable storage medium that, when executed by one or more processors, causes the one or more processors to:

receive a first request to execute a second re-accommodation that modifies the first re-accommodation;

in response to receiving the first request, retrieve a report associated with the first re-accommodation from a first database, the report including a record locator that identifies a passenger name record modified by the first re-accommodation and an identifier that identifies a first envelope of a plurality of envelopes comprising a history file of the passenger name record;

identify, based on the record locator, the passenger name record in a second database, the passenger name record being in a first state that represents a current status of the passenger name record;

identify, based on the identifier, a portion of the history file corresponding to a modification made to the passenger name record by the first re-accommodation;

determine, based on the portion of the history file, a second state of the passenger name record that represents a first previous status of the passenger name record before the first re-accommodation;

determine, based on the first request, a third state of the passenger name record that represents a desired status of the passenger name record after execution of the second re-accommodation; and modify, based on the second state, the passenger name record from the first state to the third state.

* * * * *